United States Patent
Lange et al.

[11] 3,938,016
[45] Feb. 10, 1976

[54] ACTUATOR POSITION CONTROL

[75] Inventors: Henry James Lange, Juneau; Myron Lee McCunn, Horicon; Martin Adolph Berk, Horicon; Peter Jay Classen, Horicon; David Thomas Allen, Horicon, all of Wis.

[73] Assignee: Deere & Company, Moline, Ill.

[22] Filed: Sept. 18, 1974

[21] Appl. No.: 506,978

[52] U.S. Cl. ............... 318/467; 318/282; 318/673
[51] Int. Cl.² ........................................ G05B 11/14
[58] Field of Search .......... 318/466, 467, 295, 673, 318/672, 282, 280, 675

[56]  References Cited
UNITED STATES PATENTS

| | | | |
|---|---|---|---|
| 3,080,514 | 3/1963 | Foss et al. | 318/672 |
| 3,199,007 | 8/1965 | Stewart | 318/467 X |
| 3,303,403 | 2/1967 | Bonanno | 318/295 X |
| 3,395,323 | 7/1968 | Peters | 318/673 X |
| 3,614,574 | 10/1971 | Hodges | 318/467 |

*Primary Examiner*—Benjamin Dobeck

[57] ABSTRACT

A manually shiftable actuator-position input member and an actuator-operator feedback member cooperate as switch means for controlling the operation of an actuator including a rod connected to be reciprocably driven by a reversible electric motor. The input and feedback members normally occupy neutral positions relative to each other wherein electrical current is disconnected from the motor. Energization of the motor to cause it to drive in the forward and reverse directions may respectively be accomplished by moving the input member in opposite first and second directions from its neutral position. The distance through which the input member is moved preselects the distance through which the motor drives the rod, the motor driving the feedback member via the rod such as to restore the neutral positions of the input and feedback members when the rod has been driven to the preselected position.

6 Claims, 2 Drawing Figures

ACTUATOR POSITION CONTROL

BACKGROUND OF THE INVENTION

The present invention relates to a control for an electric motor of an actuator and more particularly relates to a position switch control by which a preselected position of the actuator may be selected, the control acting to de-energize the electric motor once the actuator has reached the preselected position.

Powered actuators are used for positioning many elements. Usually an operator must divide his attention among several different controls during the operation of a piece of equipment and it is therefore desirable to have some functions performed automatically.

While controls for achieving automatic position control are known in the art, many of these devices are quite complicated and are not entirely reliable.

SUMMARY OF THE INVENTION

According to the present invention, an improved position control means is provided for automatically controlling the position to which an output member will be driven by a reversible electric motor.

An important feature of the present invention resides in the provision of a control which is compact and simply constructed. A more specific feature of the invention resides in the provision of a manually controlled input member and an actuator controlled feedback member which cooperate as switch means for controlling the operation of the electric drive motor of the actuator.

These and other features will become apparent from a reading of the following description in conjunction with the appended drawings.

DESCRIPTION OF THE PREFERRED EMBODIMENT

Figure 1:
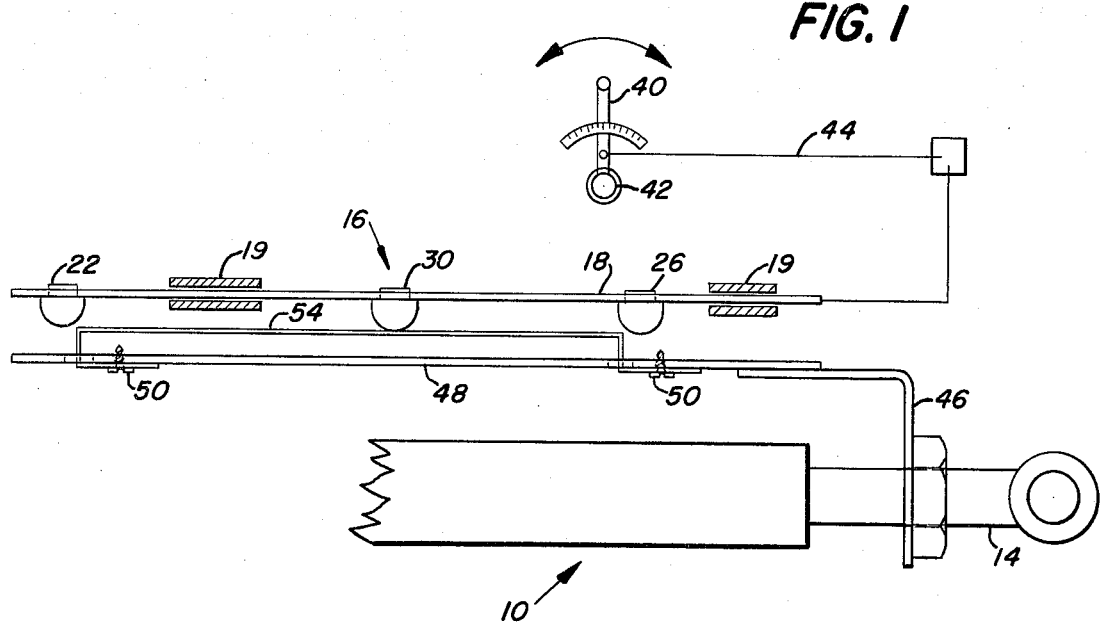
FIG. 1 is a partial schematic view of the actuator and control system of the present invention.
Figure 2:
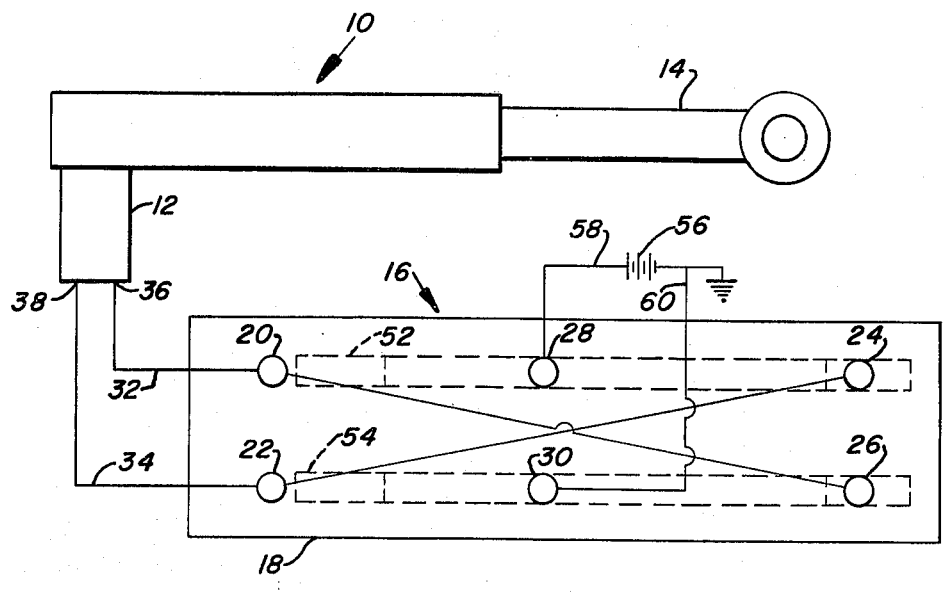
FIG. 2 is a schematic view of the electric circuitry for controlling the electric motor of the actuator.

Referring now to the drawings, therein is shown a linear actuator indicated in its entirety by the reference numeral 10. The actuator 10 is of the type generally similar to that disclosed in U.S. Pat. No. 2,424,492 issued on 22 July 1947 to Morris and includes a reversible electric motor 12 which is drivingly connected to a rod 14 for reciprocating the latter in response to the electric motor being driven in forward and reverse directions. The right end of the rod 14 is adapted to be connected to an element to be controlled by the actuator 10.

For the purpose of controlling the motor 12 so as to position the rod 14 in a predetermined position, there is provided a position control mechanism indicated in its entirety at 16. The mechanism 16 includes a manually shiftable input or primary slide member 18 here shown supported by supports 19 for linear right and left shifting movement. In order to maintain a constant relationship between the directions of movement of the rod 14 and slide member 18, the supports 19 may be fixed rigidly to the actuator 10. The member 18 is constructed of a flat, rectangular piece of electrically non-conductive material and mounted in the member 18 are a left pair of electrical contacts 20 and 22, a right pair of electrical contacts 24 and 26 and an intermediate pair of electrical contacts 28 and 30. The left, right and intermediate pairs of contacts are longitudinally aligned in the member 18 and first and second leads 32 and 34 respectively connect the contacts 20 and 22 to first and second terminals 36 and 38 of the electric motor 12 and respectively to the right contacts 26 and 24. For the purpose of shifting the member 18, there is schematically shown a lever 40 pivotally mounted for right and left swinging movement about a mounting pin 42 to respectively cause the member to be shifted leftwardly and rightwardly through means of a motion-transmitting linkage, which may be a Bowden wire or the like, indicated functionally here by the line 44.

Rigidly fixed to the actuator rod 14 through means of a connecting bracket 46 is a feedback or followup slide member 48. The feedback member 48 is disposed in parallel facing relationship relative to the input member 18. Like the input member 18, the feedback member 48 is constructed of a flat, rectangular piece of electrically non-conductive material and secured to the member 48, as by screws 50, are a pair of electrically conductive strips of material 52 and 54 which are arranged parallel to each other and respectively in alignment with the contacts 20, 24 and 28, and the contacts 22, 26 and 30. The strips 52 and 54 are somewhat resilient and are respectively mounted so as to be in constant engagement with the intermediate contacts 28 and 30 throughout the movement of the rod 14. As viewed in FIG. 1, the left and right ends of the strips 52 and 54 are respectively spaced just slightly from the left pair of contacts 20 and 22 and the right pair of contacts 24 and 26. The opposite terminals of a battery 56 are respectively connected to the intermediate pair of contacts 28 and 30 respectively through means of leads 58 and 60. Thus, it will be appreciated that upon swinging the lever 40 leftwardly from its position shown in FIG. 1, the input member 18 will be moved rightwardly to bring the left pair of contacts 20 and 22 respectively into engagement with the strips 52 and 54 to complete a circuit between the motor 12 and the battery 56. This connection of the battery with the motor 12 will cause the latter to be driven such that it causes the rod 14 to be moved rightwardly, and rightward movement of the rod 14 will continue until the strips 52 and 54 are again moved out of contact with the left pair of contacts 20 and 22.

Similarly, it is evident that rightward swinging movement of the lever 40 will cause the input member 18 to be shifted leftwardly to bring the right pair of contacts 24 and 26 into engagement with the strips 52 and 54 to complete a circuit to the motor 12 to drive it in a direction for causing the rod 14 to move leftwardly, the leftward movement continuing until the strips 52 and 54 are again moved out of contact with the right pair of contacts 24 and 26.

It will be appreciated then that the automatic positioning of the rod 14 to a preselected position may be accomplished by moving the lever 40 to an angular location corresponding to the desired position.

While the actuator position control disclosed here is adapted for use with an electrically driven actuator having a linear output, it is to be understood that the principle of the present invention could be applied to actuators having rotary outputs by merely substituting arcuate members for the input and feedback members 18 and 48.

The operation of the actuator position control is thought to be clear from the foregoing description and for the sake of brevity, the operation is not discussed further.

We claim:

1. In a combination of an actuator including a reversible electric motor and a control for the motor wherein the combination is of a type including an electical energy source connected to the motor by circuitry including control switch means having a normal condition disconnecting the source from the motor and first and second operative conditions respectively connecting the source to the motor for effecting forward and reverse driving of the motor; a manually operable input member connected to the switch means for controlling movement of the latter to its first and second operative conditions; a follow-up member connected to an output member of the actuator and to the switch means for restoring the latter to its neutral condition after the output member has undergone a predetermined movement corresponding to a selected setting of the input member, the improvement comprising: said input and followup members being mounted adjacent each other for relative movement along parallel first and second paths; said control switch means being entirely embodied in said input and follow-up members and including first electrical contact means carried by the input member and second electrical contact means carried by the follow-up member; said first and second electrical contact means being so arranged relative to each other that when the input and follow-up members bear a first spatial relationship to each other the neutral condition of the switch means exists and when the input member is respectively moved in said first and second directions, to thus disturb the first spatial relationship, the first and second operative conditions respectively exist.

2. The automatic position control defined in claim 1 wherein said input and follow-up members are reciprocably mounted; said input member being electrically nonconductive and said first set of electrical contact means including first, second, third, fourth, fifth and sixth contacts; said first and fifth contacts being interconnected with each other and to a first terminal of said motor and said second and sixth contacts being interconnected with each other and a second terminal of said motor; said third and fourth terminals being connected across said source of electrical energy; said follow-up member being electrically nonconductive; first and second electrically conductive straps being secured to said output member and respectively positioned so as to be in constant engagement with said third and fourth contacts throughout the movements of said input and follow-up members; said first and second electrically conductive straps respectively being positioned relative to said first and fifth contacts and said second and sixth contacts such that movement of the input member in said first direction when the motor is deactivated will complete a circuit between the motor and the source of electrical energy by bringing the first and second strap members respectively into engagement with the first and second contacts, and such that movement of the input member in said second direction when the motor is deactivated will complete a circuit between the motor and source of electrical energy by bringing the first and second strap members respectively into engagement with the fifth and sixth contacts.

3. An actuator position control comprising: an actuator including an electric motor coupled to an output shaft; a source of electric power; electric circuitry connecting said source to said motor and including current reversing switch means operable among open, first closed and second conditions for respectively establishing de-energized, forward driving and reverse driving conditions in said motor; said switch means including an electrically nonconductive feedback member joined by operative connection means to said output shaft for movement thereby in opposite first and second directions along a first path, and an electrically nonconductive manually operable control input member mounted adjacent said feedback member for selected movement in said first and second directions; first, second and third pairs of electrical contacts mounted on one of said feedback and input members and respectively connected across said source, across said motor for driving it in the forward direction and across said motor for driving it in the reverse direction; and a fourth pair of electrical contacts mounted on the one of said feedback and input members not having said first, second and third pairs of contacts mounted thereon and the latter named pairs of contacts being located relative to each other and the fourth pair of contacts such that the fourth pair of contacts respectively engage only said first pair of contacts to establish said open condition of the switch means when the feedback and input members are in respective first positions relative to each other, that the fourth pair of contacts respectively interconnect only the second pair of contacts with the first pair of contacts to establish said first closed condition in said switch means when the input member is moved from its first position in said first direction relative to said feedback member and that the fourth pair of contacts respectively interconnect only the third pair of contacts with the first pair of contacts to establish said second closed condition in said switch means when the input member is moved from its first position in said second direction relative to said feedback member.

4. The position control defined in claim 3 wherein said first, second and third pairs of contacts are each arranged crosswise to said first path and are aligned with each other in the direction of said first path with said first pair of contacts located between the second and third pairs of contacts; said first, second and third pairs of contacts being in the form of small protuberances respectively projecting in the path of movement of said fourth pair of contacts; said fourth pair of contacts respectively including a pair of straps elongated in the direction of movement thereof and having a length just slightly less than the distance between said second and third pairs of contacts along the path of movement of the latter.

5. The position control defined in claim 4 wherein said actuator includes a linearly reciprocable rod; said feedback member being secured to said rod and having a contact mounting position paralleling said rod; and said input member being mounted for reciprocable movement paralleling said rod.

6. The power lift system defined in claim 5 wherein the fourth pair of contacts is mounted on said feedback member.

* * * * *